Jan. 10, 1939. H. G. FLAGLER Re. 20,972

METHOD OF AND MACHINE FOR BENDING SHEET METAL

Original Filed Jan. 29, 1937. 2 Sheets-Sheet 1

Inventor
Harold G. Flagler.
By: Amos, Thiess, Olson & Mecklenburger.
Attys.

Jan. 10, 1939. H. G. FLAGLER Re. 20,972

METHOD OF AND MACHINE FOR BENDING SHEET METAL

Original Filed Jan. 29, 1937 2 Sheets-Sheet 2

Inventor:
Harold G. Flagler:
By: Amos, Pierce, Olson & Mecklenburger. Attys.

Reissued Jan. 10, 1939

Re. 20,972

UNITED STATES PATENT OFFICE 20,972

METHOD OF AND MACHINE FOR BENDING SHEET METAL

Harold G. Flagler, Chicago, Ill.

Original No. 2,105,240 dated January 11, 1938, Serial No. 122,892, January 29, 1937. Application for reissue June 6, 1938, Serial No. 212,207

24 Claims. (Cl. 153—28)

This invention relates to a method of, and machine for, bending sheet metal to form a seam or fold therein, and has particular relation to a novel sequence of steps in the bending or folding of metal and further to a metal forming machine which is definitely less expensive than those which are now used for similar purposes.

Moreover, the sequence of steps employed results in an improved seam or fold in the metal. As hereinafter more fully pointed out in connection with the description or the machine and the manner in which the latter is used to form the seam or fold in the metal, the latter is produced with the expenditure of a minimum amount of power, this advantage resulting from the novel arrangement of certain power driven rolls which act upon the metal to produce the required fold or shape. Moreover, the sequence of operations and the machine which is hereinafter described to secure the same are such that the seam is straight and the material leaves the machine in a desirable flat condition and is not stretched or wavy as is sometimes the case in the machines now being used.

Other advantages of the method here disclosed, and of an illustrative machine in which said method is practiced, will be emphasized in the description thereof which is hereafter given in connection with the accompanying drawings, wherein.

Figures 1, 2:
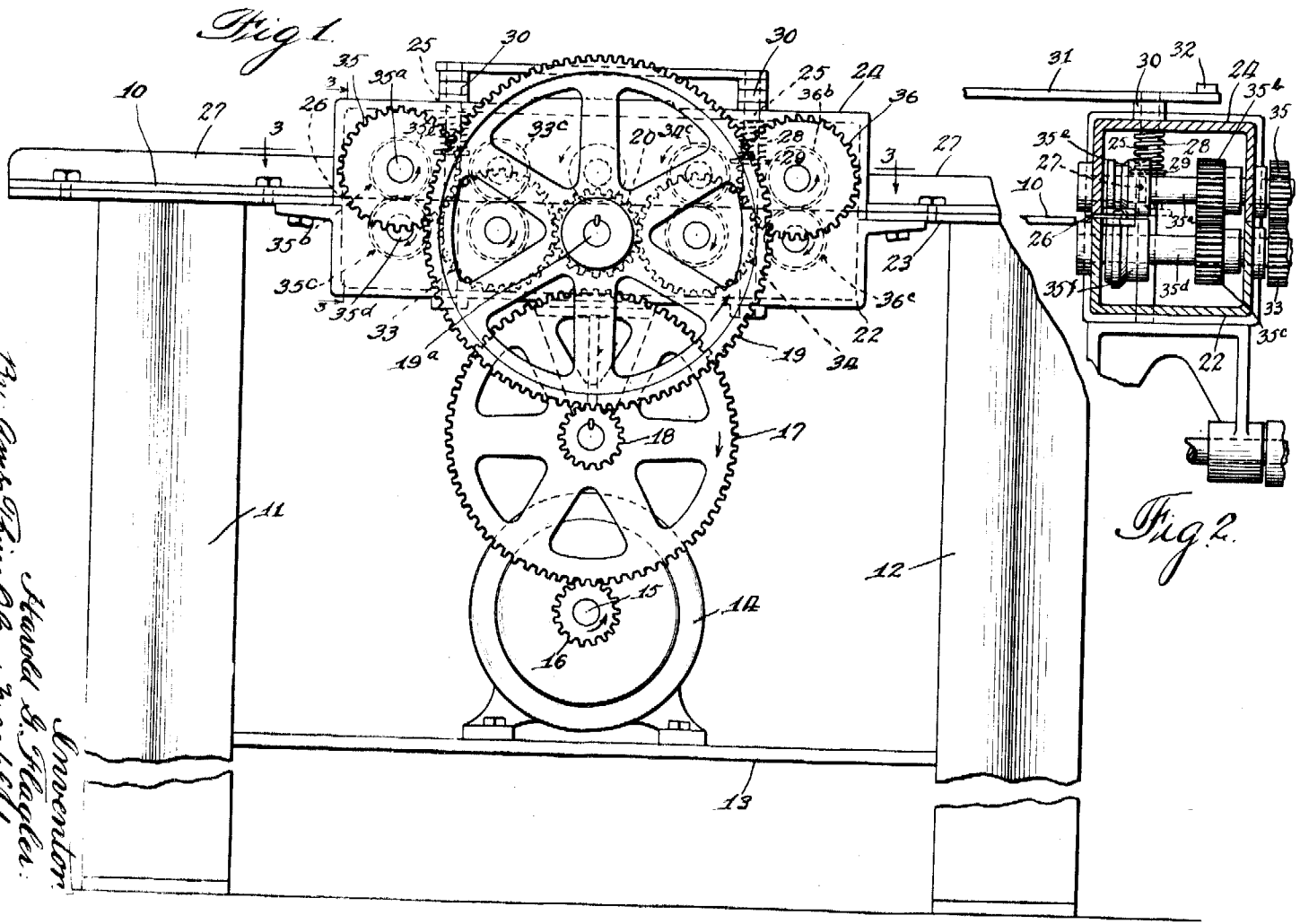
Fig. 1 is an elevational view of a machine in which the invention is practiced.
Fig. 2 is an elevational sectional view taken on the line 2—2 of Fig. 1.
Figure 3:
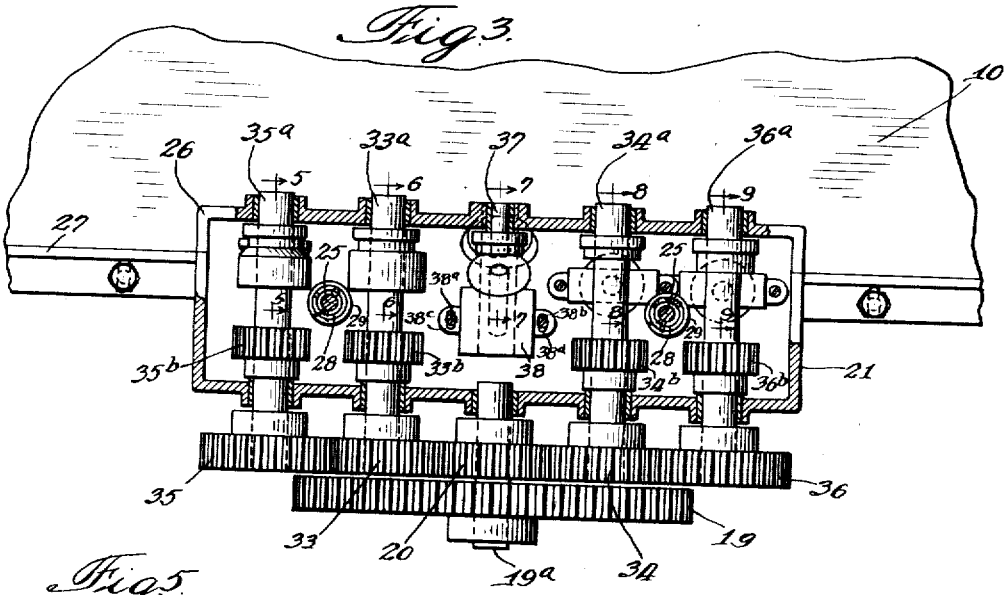
Fig. 3 is a plan sectional view taken on line 3—3 of Fig. 1.

Figs. 5, 6, 7, 8, and 9 are fragmentary elevational views on similarly numbered section lines of Fig. 3, said Figs. 5, 6, 7, 8, and 9 illustrating the mechanism employed in the progressive steps in the forming of the steam or fold in the sheet metal.

The machine consists of a bed 10 supported by legs 11, 12, between which latter a reinforcing motor-supporting cross member or plate 13 extends. A motor 14 is positioned on the plate 13 and is provided with shaft 15, to which is pinned a gear 16.

Gear 17 meshes with gear 16, and on the shaft of said gear 17 is pinned gear 18, which, in turn, meshes with a large gear 19, to the shaft 19a of which latter is, in turn, pinned a gear 20, whence are driven the gears operating the power rolls hereinafter described.

The method herein described contemplates the employment of four sets of power or driven rolls and one set of idler rolls, all of the aforesaid power rolls being positioned in a casing 21, which latter comprises two portions, a lower portion 22 which is secured to a cross member 23 of the bed part of the machine and an upper half 24 so secured to the lower half by means of studs 25, 25 that a desired adjustment of the opening in the slot through which the material passes is obtained.

The upper half of the power roll enclosing casing 24 is so matched with the lower half and the casing portions are so formed that an opening therebetween comprises a slot 26 through which the metal sheet is fed into the interior of the casing and between the forming or shaping rolls, it being noted that the bed 10 which supports the metal sheet as it is fed between the folding rolls has upstanding therefrom a right angle flange 27 comprising an abutment which guides the material in a straight line as it passes between the rollers.

Figure 4:
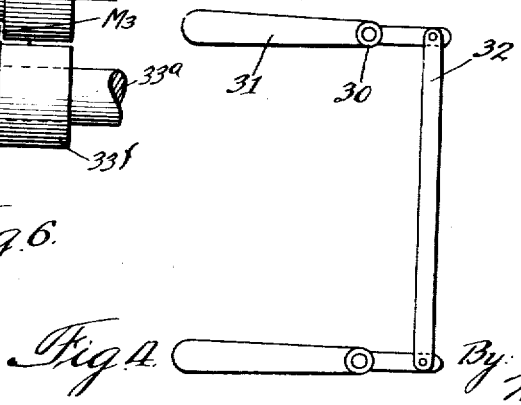
Fig. 4 is a fragmentary top plan view of a portion of machine shown in Fig. 1.

The upper half of the casing or frame is positioned on the studs with cushioning springs 28 located between the under side of the upper part of the casing 24 and annular abutments 29, 29 fixed to the studs. Nuts 30 are threaded to the studs 25 and are so associated with linkage (best shown in Fig. 4) comprising two handle members 31 and a connecting link 32 that adjustment of the upper half of the frame vertically may be secured by moving either one or both of the graspable members 31, this being a particularly desirable means for securing a proper adjustment of the parts concerned with a single movement. This adjustment is also utilized to take care of different gauges of material, i. e., when it is necessary to move the shafts,—which will hereafter be described and on which the upper power rolls are mounted,—vertically with respect to the shafts on which the bottom power rolls are mounted.

Reverting now to the power means employed in the disclosed machine, the small gear 20 meshes with gears 33 and 34, which are pinned to shafts 33a and 34a, respectively. The gears 33 and 34 also mesh with gears 35 and 36, which are mounted on shafts 35a and 36a, it being noted that the shafts 33a and 34a are journalled in the lower half 22 of the box-shaped casting 21 and that the shafts 35a and 36a are journalled in the upper half 24 of the same casting. Gears 33b and 34b are mounted on shafts 33a and 34a, respectively, and gears 35b and 36b are mounted on shafts 35a and 36a, respectively.

The latter gears mesh with similar gears on shafts directly above in the case of 33b and 34b and directly below in the case of gears 35b and 36b. The gears in question are designated as 32c, 34c, 35c, and 36c, and the shafts upon which these are mounted are respectively designated 33d, 34d, 35d, and 36d. The rolls for forming the aforedescribed seam or fold in the sheet metal will now be described, and it is suggested that main reliance be placed upon Figs. 5 to 9, inclusive, in following this portion of the description.

Figure 5:
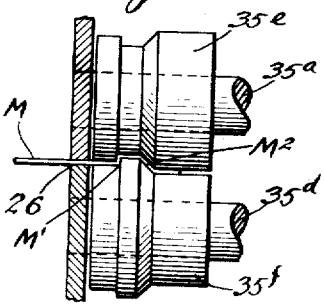
Figure 7:
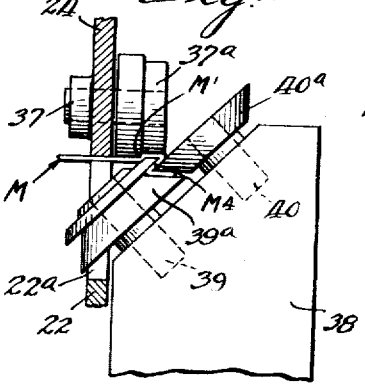

A sheet of metal is designated M, and, referring first to Fig. 5, passes through the slot 26 with the edge thereof (referring to Fig. 3) being held against the upstanding abutment 27 to insure the guiding of the sheet in a straight line. The sheet of metal is first engaged by forming rolls 35e and 35f mounted, respectively, on shafts 35a and 35d, which rolls are driven by the engagement of gears 35b and 35c, the latter, in turn, being operated by the heretofore described train of driven gears. The Fig. 5 forming rolls are novel in the manner in which the metal is initially crimped or formed because of the immediate formation of a substantially 90 degree offset $M_1$, which offset, after being thus initially formed, is retained throughout subsequent operations.

The formation of this offset immediately produces definite advantages which have not heretofore been obtainable in the making of a fold of the character set forth herein. It has been discovered that this offset may be made at this point at the same time that the initial steps in the bending of the metal to form an associative fold are being undertaken and that, by thus making the offset at this point at the same time another fold is made, a desirable economy in the amount of power necessary to make the fold is secured. Not only is the actual power expended less in amount, but, because of the aforesaid novel arrangement, a machine for practicing the method may be constructed more economically than has heretofore been possible.

The other initially-made associated bend in the metal is designated $M_2$ and comprises a 45 degree bend.

Figure 6:
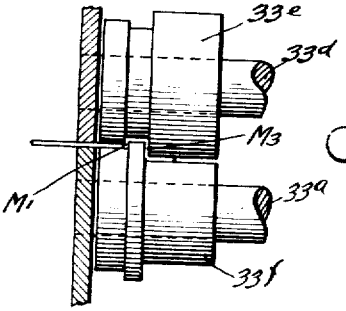

Te metal sheet is next led between the rolls shown in Fig. 6, i. e., between the roll 33e and 33f mounted on the indicated associated shafts and driven similarly to those first discussed. In this latter forming operation, it will be noted that the offset $M_1$ is retained in its original form and that, because of its being thus retained, the manner in which the 45 degree fold $M_2$ is progressed into a 90 degree fold $M_3$ is greatly simplified.

Before proceeding with the description of the other power-driven forming rolls, it is necessary at this point to discuss certain undersetting idler rolls which are not necessarily power driven and which may be thus idle because of the novel sequence of steps which are here employed. A shaft 37 is mounted in the side wall of the upper casing portion 24 and has pinned thereto a roll 37a. The matching wall of the lower box-like casing 22 is provided with an opening 22a through which certain other idler rolls may protrude if desired. A journal block member 38 is mounted within the casing to support and provide journals for shafts 39 and 40. Bevelled rolls 39a and 40a are mounted on the aforesaid shafts 39 and 40, respectively, and, as the metal passes through the latter-described set of rolls, the offset $M_1$ is retained, but the 45 degree rolls 39a and 40a operate to form a Z bend $M_4$ in the metal to the right of the offset end $M_1$.

This very desirable bending operation is thus secured without the expenditure of power and, by the novel arrangement of the rolls at an angle, is obtained without undesirable stresses being placed upon either the metal or the rolls, this occurring in considerable part because the rolls, by being mounted as shown, may form the desired fold directly as dictated by the shape of the rolls.

Figure 8:
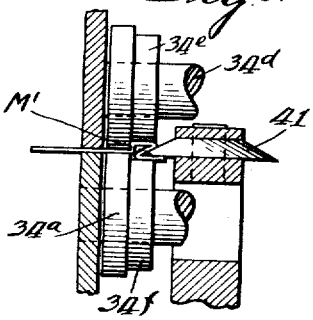

The metal is next passed between the rolls shown in Fig. 8, i. e., the rolls 34e and 34f. The offset $M_1$ is still retained, but, as the metal is thus retained in the aforesaid shape between the rolls, the lower horizontal leg of the Z fold $M_4$ is pressed upwardly towards the upper horizontal leg thereof by the lower roll 34f operating as indicated. An idler roll 41 having an acutely angled edge, as shown, is so mounted as to be continuously drawn tightly between the cross member and the lower part of the Z fold with the result that the metal is kept straight and the heretofore undesirable waving and wandering of the fold as the progressing metal reached this point is avoided.

Figure 9:
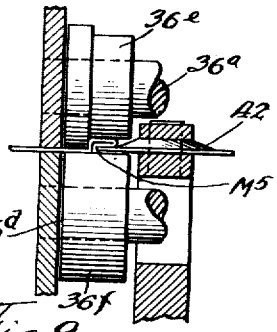

The metal next proceeds between the rolls of Fig. 9, i. e., 36e and 36f, between which rolls the bottom of the Z bend is forced upwardly as shown at $M_5$ so that all of the folds in the metal are parallel to each other. However, in order to insure the desired opening between the lower two folds, an idler opening roll 42 is provided to continuously interpose between the folds indicated, thereby to insure that the fold, although definitely compacted, will have the opening as desired.

It will be noted that the block 38,—in which the rolls 39a and 40a are journaled,—is adjustable in a horizontal direction by reason of the fastening means 38a and 38b extending through slotted mounting lugs 38c and 38d, respectively. This structure permits movement of the block 38 towards or from the wall of the casing with consequent variable control of the point at which rolls 39a and 40a grip the sheet and this,—in connection with the play which is permitted lengthwise of shafts 33a, 34a, 35a, and 36a (by reason of the rollers thereon not abutting flush against the casing wall),—insures a proper bias of the metal sheet as it passes between the rolls in such direction as to cause the edge of the metal positively to contact with the aligning abutment 27 during its passage through the machine, irrespective of "bow" which may exist in the metal sheet undergoing bending. Because of the aforesaid adjustability of block 38, the point of sheet grip and the shaft play, proper alignment of the sheet may be secured by variations corresponding to the existing bow in the sheet.

While a particular embodiment of this invention is herein shown and described, it is to be understood that various modifications thereof will be apparent to those skilled in the art without departing from the spirit and scope of this invention, and, therefore, the invention is to be limited only by the scope of the prior art and the appended claims.

I claim:

1. In the formation of a sheet metal joint member, the method of procedure which comprises initially and simultaneously forming a 90 degree offset in said metal and a 45 degree offset in the portion of said metal on one side of said 90 degree offset, then increasing said second offset to a 90 degree bend and thereafter completing said joint member by folding the metal comprised in said portion into parallelism with the main body of metal, the first formed 90 degree offset being continuously maintained throughout all of the folding operations.

2. In the formation of a sheet metal joint member, the method of procedure which comprises initially forming a 90 degree offset and a 45 degree offset, progressing said 45 degree offset into a 90 degree and finally into a 180 degree fold while retaining the first-mentioned 90 degree offset, said 180 degree fold being formed beside the said first-referred-to 90 degree offset and the lower portion of the said folded metal being coplanar with the main body of the metal.

3. In a sheet metal forming machine, an initially contacted set of forming rolls for producing a substantially 90 degree offset in the metal and a 45 degree offset therebeside, power-driven forming rolls for increasing said 45 degree offset to a 90 degree bend, idler rolls for progressing said last described fold into a Z, and power rolls for closing said Z upon itself beside said first formed 90 degree offset.

4. In a sheet metal forming machine, an initially contacted set of forming rolls for producing a substantially 90 degree offset in the metal and a 45 degree offset therebeside, power-driven forming rolls for increasing said 45 degree offset to a 90 degree bend, idler rolls for progressing said last described fold into a Z, power rolls for closing said Z upon itself beside said first formed 90 degree offset, and means for insuring an opening between the bottom folds of the collapsed Z portion.

5. In a sheet metal forming machine, an initially contacted set of forming rolls for producing a substantially 90 degree offset in the metal and a 45 degree offset therebeside, power-driven forming rolls for increasing said 45 degree offset to a 90 degree bend, idler rolls for progressing said last described fold into a Z, and a journal block for said last named idler rolls, said block being mounted to be adjustable horizontally to promote desired alignment of the metal being operated upon.

6. In a sheet metal forming machine, an initially contacted set of forming rolls for producing a substantially 90 degree offset in the metal and a 45 degree offset therebeside, power-driven forming rolls for increasing said 45 degree offset to a 90 degree bend, idler rolls for progressing said last described fold into a Z, and power rolls for closing said Z upon itself beside said first formed 90 degree offset, all of the rolls being mounted upon shafts which have a horizontal play in the journals thereof to promote positive alignment.

7. In a sheet metal forming machine, an initially contacted set of forming rolls for producing a substantially 90 degree offset in the metal and a 45 degree offset therebeside, power-driven forming rolls for increasing said 45 degree offset to a 90 degree bend, idler rolls for progressing said last described fold into a Z, a journal block for said last named idler rolls, said block being mounted to be adjustable horizontally to promote desired alignment of the metal being operated upon, and power rolls for closing said Z upon itself besides said first formed 90 degree offset, all of the rolls being mounted upon shafts which have a horizontal play in the journals thereof to promote said desired alignment.

8. In a sheet metal forming machine, an initially contacted set of forming rolls for producing a substantially 90 degree offset in the metal and a 45 degree offset therebeside, power-driven forming rolls for increasing said 45 degree offset to a 90 degree bend, idler rolls for progressing said last described fold into a Z, and means for horizontally adjusting said idler rolls to promote desired alignment of the metal being operated upon.

9. In a sheet metal forming machine, an initially contacted set of forming rolls for producing a substantially 90 degree offset in the metal and a 45 degree offset therebeside, power-driven forming rolls for increasing said 45 degree offset to a 90 degree bend, idler rolls for progressing said last described fold into a Z, means for horizontally adjusting said idler rolls to promote desired alignment of the metal being operated upon, and power rolls for closing said Z upon itself beside said first formed 90 degree offset, all of the rolls being mounted upon shafts which have a horizontal play in the journals thereof to promote said desired alignment.

10. In a sheet metal forming machine, an initially contacted set of forming rolls for producing a 90 degree offset in said metal to form the inner edge of a folded joint, and a plurality of subsequently contacted forming rolls for retaining said initially formed 90 degree offset and for acting upon said metal outwardly of said offset to produce a pair of oppositely disposed 180 degree bends therein to form a folded joint having a plurality of parallel folds in parallelism with the main body of metal on one side of said offset.

11. In the formation of a sheet metal joint member, the method of procedure which comprises initially and simultaneously forming a 90 degree offset in said metal and a 45 degree offset in the portion of said metal on one side of said 90 degree offset and thereafter folding the metal comprised in said portion including said second offset to form two parallel portions disposed in slightly spaced relation to each other in parallelism with the main body of metal, the first formed 90 degree offset being continuously maintained throughout all of the folding operations.

12. In the formation of a sheet metal joint member, the method of procedure which comprises initially and simultaneously forming a 90 degree offset in said metal and a 45 degree offset in the portion of said metal on one side of said 90 degree offset and thereafter folding upon itself the metal comprising said portion including said second offset to form a folded joint member including a plurality of parallel folds disposed entirely within said 90 degree offset in parallelism with the main body of metal, said 90 degree offset being continuously maintained throughout the folding operations.

13. In the formation of a sheet metal joint member, the method of procedure which comprises initially forming a 90 degree offset, simultaneously with said 90 degree offset forming complementary 45 degree bends in the metal intermediate said offset and one edge of the metal to provide a marginal portion parallel with the main body of metal, and thereafter forming said 45 degree bends into 180 degree folds while maintaining said 90 degree offset.

14. In a sheet metal forming machine, an initially contacted set of forming rolls for producing a substantially 90 degree offset in the metal and a second offset of less than 90 degrees therebeside, power driven forming rolls for increasing said second offset to a 90 degree bend, idler rolls for progressing said last described bend into a Z, and means for horizontally adjusting said idler rolls to permit desired alignment of the metal being operated upon.

15. In the formation of a sheet metal joint member, the method of procedure which comprise initially forming a 90 degree offset, simultaneously with said 90 degree offset forming complementary bends in the metal intermediate said offset and one edge of the metal to provide a marginal portion parallel with the main body of metal, and thereafter forming said complementary bends into 180 degree folds while maintaining said 90 degree offset.

16. In the formation of a sheet metal joint member, the method of procedure which comprises initially and simultaneously forming a first offset in the sheet metal and a second offset in the portion of said metal on one side of said first offset, and thereafter folding the metal comprised in said portion including said second offset to form two substantially parallel portions disposed entirely within said first offset in substantial parallelism with the main body of metal, said first offset being continuously maintained throughout the folding operations.

17. In a sheet metal forming machine, an initially contacted set of forming rolls for producing an offset of substantial angularity in the metal to form the inner edge of a folded joint, and a plurality of subsequently contacted forming rolls for retaining said initially formed offset and for acting upon said metal outwardly of said offset to produce a pair of oppositely disposed 180 degree bends therein to form a folded joint having a plurality of parallel folds in parallelism with a main body of metal on one side of said offset.

18. In the formation of a sheet metal lock joint, the method of procedure which comprises initially and simultaneously forming in said metal an offset not greater than 90 degrees and a second offset of less than 90 degrees therebeside, and thereafter increasing said second offset and folding the metal comprised therein into double parallelism with the main body of metal, the first-mentioned offset being continuously maintained throughout all the folding operations at substantially the same angularity with the main body of metal as when initially formed.

19. In the formation of a sheet metal lock joint, the method of procedure which comprises initially and simultaneously forming in said metal an offset not greater than 90 degrees with the sheet of metal and a second offset therebeside, and thereafter increasing said second offset and folding the metal comprised therein into double parallelism with the main body of metal, said first-mentioned offset irrespective of its initially formed degree of angularity, being not greater than 90 degrees upon the completion of the folding operations.

20. In the formation of a sheet metal lock joint, the method of procedure which comprises initially and simultaneously forming an offset in said metal greater than zero degrees but not greater than 90 degrees and a second offset of less than 90 degrees therebeside, then folding the second offset into substantial parallelism with the main body of metal thereby to form said lock, the first-mentioned offset being continuously maintained throughout the folding operations to comprise upon the completion of said folding operation at least the same angularity as that into which it was originally formed.

21. In a sheet metal forming machine, an initially contacted set of forming rolls for producing an offset in said metal greater than zero degrees but not greater than 90 degrees and an offset of less than 90 degrees therebeside, rolls for increasing said second offset progressively into a Z fold and rolls for closing said Z upon itself beside and within the first-mentioned offset.

22. In a sheet metal forming machine, an initially contacted set of rolls for producing an offset in the metal not greater than 90 degrees and a second offset of less than 90 degrees therebeside, power driven forming rolls for increasing said second offset, idler rolls for progressing said second offset thereafter into a Z, and power rolls for completing the folding of the second offset to form a joint member including substantially parallel folds disposed within said first offset.

23. In a sheet metal forming machine, an initially contacted set of forming rolls for producing an offset in said metal greater than zero degrees but not greater than 90 degrees and an offset of less than 90 degrees therebeside, rolls for increasing said second offset progressively into a Z fold and rolls for closing said Z upon itself beside and within the first-mentioned offset, said latter rolls being so formed that the first-named offset is maintained throughout the operation thereof.

24. In a sheet metal forming machine, an initially contacted set of forming rolls for producing an offset in said metal greater than zero degrees but not greater than 90 degrees and an offset of less than 90 degrees therebeside, rolls for increasing said second offset progressively into a Z fold and rolls for closing said Z upon itself beside and within the first-mentioned offset, said latter rolls being so formed that the first-named offset upon completion of the forming operation is not greater than 90 degrees, irrespective of its initially formed degree of angularity.

HAROLD G. FLAGLER.

CERTIFICATE OF CORRECTION.

Reissue No. 20,972. January 10, 1939.

HAROLD G. FLAGLER.

It is hereby certified that error appears in the printed specification of the above numbered patent requiring correction as follows: Page 1, first column, line 11, for the word "or" read of; and line 43, for "steam" read seam; page 2, first column, line 7, for the reference numeral "32c" read 33c; line 52, for "Te" read The; line 53, for "the" read a; page 4, first column, line 9-10, claim 15, for "comprise" read comprises; and that the said Letters Patent should be read with this correction therein that the same may conform to the record of the case in the Patent Office.

Signed and sealed this 28th day of February, A.D. 1939.

Henry Van Arsdale.

(Seal) Acting Commissioner of Patents.